(12) United States Patent
Beck

(10) Patent No.: US 11,773,966 B2
(45) Date of Patent: Oct. 3, 2023

(54) METHOD AND TRANSMISSION CONTROL APPARATUS FOR OPERATING A MULTIPLE-SPEED VEHICLE TRANSMISSION

(71) Applicant: ZF Friedrichshafen AG, Friedrichshafen (DE)

(72) Inventor: Ralf Beck, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/930,512

(22) Filed: Sep. 8, 2022

(65) Prior Publication Data
US 2023/0184327 A1      Jun. 15, 2023

(30) Foreign Application Priority Data

Dec. 15, 2021   (DE) ..................... 10 2021 214 376.8

(51) Int. Cl.
*F16H 61/16*       (2006.01)
*F16H 59/72*       (2006.01)
(Continued)

(52) U.S. Cl.
CPC ............. *F16H 61/16* (2013.01); *F16H 59/40* (2013.01); *F16H 59/44* (2013.01); *F16H 59/48* (2013.01);
(Continued)

(58) Field of Classification Search
CPC .......... F16H 59/40; F16H 59/44; F16H 59/48; F16H 59/72; F16H 2059/443;
(Continued)

(56) References Cited

U.S. PATENT DOCUMENTS 6,776,272 B2 *   8/2004   Granderath ............. F16H 45/02
                                                      192/113.36
10,794,474 B1 *  10/2020  Bielefeld ............ F16H 61/0213
(Continued)

FOREIGN PATENT DOCUMENTS

DE    10 2009 002 108 A1    10/2010
DE    10 2017 221 401 A1    5/2019
DE    10 2020 115 131 A1    12/2021

OTHER PUBLICATIONS

German Patent Office, Office Action issued in German patent application No. 10 2021 214 376.8 (dated Jul. 8, 2022).
(Continued)

*Primary Examiner* — Edwin A Young
(74) *Attorney, Agent, or Firm* — FINCH & MALONEY, PLLC

(57) ABSTRACT

Disclosed is a method for operating a multi-gear vehicle transmission having a plurality of shifting elements (A, B, C, D, E) for engaging gears of the vehicle transmission. In a neutral gear, in which some of the shifting elements (A, B) are already actuated, a transmission input (1) is decoupled from a transmission output (2) of the vehicle transmission. In a driving gear the transmission input (1) is coupled to the transmission output (2) of the vehicle transmission by closing the shifting elements (A, B, C, D, E) associated with the driving gear, in order to propel the vehicle. With the neutral gear engaged a transmission condition is determined, and if a transmission condition with elevated drag losses exists, then in addition to the shifting elements (A, B) actuated in the neutral gear a shifting element (D) associated with a reversing gear of the vehicle transmission is also closed.

14 Claims, 2 Drawing Sheets

(51) Int. Cl.
*F16H 59/44* (2006.01)
*F16H 59/48* (2006.01)
*F16H 59/40* (2006.01)

(52) U.S. Cl.
CPC ....... *F16H 59/72* (2013.01); *F16H 2059/443* (2013.01); *F16H 2200/006* (2013.01); *F16H 2200/0052* (2013.01); *F16H 2200/0082* (2013.01)

(58) Field of Classification Search
CPC ............. F16H 61/16; F16H 2200/0052; F16H 2200/006; F16H 2200/0082
See application file for complete search history.

(56) References Cited

U.S. PATENT DOCUMENTS

| | | | |
|---|---|---|---|
| 10,836,397 B1* | 11/2020 | Christensen | F16H 61/0213 |
| 2002/0173894 A1* | 11/2002 | Gorys | B60W 30/186 |
| | | | 701/84 |
| 2010/0044140 A1* | 2/2010 | Shultz | F16H 3/66 |
| | | | 180/338 |

OTHER PUBLICATIONS

German Patent Office, Office Action issued in German patent application No. 10 2021 214 373.3 (dated Jul. 11, 2022).
German Patent Office, Office Action issued in German patent application No. 10 2021 214 377.6 (dated Jul. 8, 2022).

\* cited by examiner

| Gear | Brake | | Clutch | | |
|---|---|---|---|---|---|
| | A | B | C | D | E |
| 1 | ● | ● | ● | | |
| 2 | ● | ● | | | ● |
| 3 | | ● | ● | | ● |
| 4 | | ● | | ● | ● |
| 5 | | ● | ● | ● | |
| 6 | | | ● | ● | ● |
| 7 | ● | | ● | ● | |
| 8 | ● | | | ● | ● |
| R | ● | ● | | ● | |

METHOD AND TRANSMISSION CONTROL APPARATUS FOR OPERATING A MULTIPLE-SPEED VEHICLE TRANSMISSION

RELATED APPLICATIONS

This application claims the benefit of and right of priority under 35 U.S.C. § 119 to German Patent Application no. 10 2021 214 376.8, filed on 15 Dec. 2021, the contents of which are incorporated herein by reference in its entirety.

FIELD OF THE DISCLOSURE

The invention relates to a method for operating a multi-gear vehicle transmission. In addition, the invention relates to a transmission control unit designed to carry out the method, and to a corresponding computer program for carrying out the method in the transmission control unit. Furthermore, the invention relates to a vehicle transmission and a motor vehicle with a vehicle transmission.

BACKGROUND

Multi-gear transmissions are known in automotive technology and are widely used. The gears, also called steps or gear ratios, produce various transmission ratios of the transmission between a transmission input and a transmission output. The gears can be selectively engaged. In that way, a torque delivered by a drive motor of the vehicle can be converted as a function of the situation. For example, in a starting gear a high gear ratio can be selected in order to accelerate the vehicle. In another driving gear a lower gear ratio can be selected in order to maintain the speed of the vehicle with lower fuel consumption. The individual gears are engaged by means of shifting elements of the transmission.

In a neutral gear of the vehicle transmission, also called the idling gear, the transmission input and the transmission output are decoupled from one another. To engage the neutral gear a sufficiently large number of shifting elements of the transmission are opened. The engagement of the neutral gear can be called for by a driver of the vehicle, or automatically.

When the neutral gear is engaged, in practice it is desirable to change gear into one of the driving gears of the transmission as quickly and comfortably as possible, particularly into the starting gear used for starting off. To prepare for this gearshift the so-termed air-gap of at least one of the shifting elements for the starting gear can be selectively reduced. In the case of a pressure-medium-actuated shifting element this preparation takes place in that in the neutral gear, the actuating piston of the shifting element is pre-filled with pressure medium. During this a certain amount of pressure medium is already delivered to the actuating piston. The said amount is calculated such that the shifting element is not yet closed. The closing process can then be initiated by feeding in more pressure medium and/or increasing the pressure in the actuating piston. In particular, during the pre-filling the shifting element is brought (almost) to its so-termed touch-point.

A method for controlling a multi-gear vehicle transmission is known from DE 10 2017 221 401 A1.

SUMMARY

The purpose of the present invention is to provide a new type of method for operating a multi-gear vehicle transmission. In addition, a transmission control unit designed to carry out the method, a computer program for implementing the method in the transmission control unit, a vehicle transmission, and a motor vehicle with a vehicle transmission are indicated.

Form the process-technological standpoint, this objective is achieved by the features disclosed herein. A transmission control unit designed to carry out the method is also disclosed. Finally, a computer program for implementing the method on such a transmission control unit and a vehicle transmission with such a transmission control unit and a motor vehicle with such a vehicle transmission are the objects of further aspects of the present disclosure. Advantageous further developments will be apparent from the following description and the drawings.

According to the present invention, a method for operating a multi-gear vehicle transmission is proposed. The vehicle transmission has a plurality of shifting elements for engaging the gears of the vehicle transmission. The vehicle transmission has at least one neutral gear and at least one gear designed for forward driving and a gear designed for reverse driving. In the neutral gear the transmission input and the transmission output are decoupled from one another, so that in the neutral gear at least some of the shifting elements of the vehicle transmission can be actuated. The neutral gear corresponds to idling of the transmission. On the other hand, in the driving gear the transmission input is coupled to the transmission output in order propel the vehicle. This coupling can be effected by closing the shifting elements associated with the driving gear. Thus, the gearshift from the neutral gear to the driving gear is carried out by closing the shifting elements of the vehicle transmission associated with the driving gear.

The shifting elements of the vehicle transmission can be termed transmission shifting elements and are in the form of clutches and/or brakes. The shifting elements can be designed to be actuated by a pressure medium, for example hydraulically or pneumatically. In particular, the lubricant of the vehicle transmission is used as the pressure medium. Preferably the shifting elements are in the form of frictional shifting elements, such as a disk clutch or a disk brake. The vehicle transmission is in particular an automatic transmission of planetary design. The actuation of the shifting elements is preferably controlled by a transmission control unit. Thus, the transmission control unit brings about the situation-related actuation of the shifting elements. The vehicle transmission is designed to be used in a motor vehicle, for example in a passenger car, a truck or a powered omnibus. However, the vehicle transmission can also be designed for use in a rail vehicle or an agricultural vehicle, or in other vehicles.

A driving gear is understood to mean those gears of the vehicle transmission which are provided for propelling the vehicle, i.e. forward-driving and reverse-driving gears. The driving gear is preferably a starting gear for starting the vehicle on its way. Such a starting gear is in particular one which, compared with other gears of the vehicle transmission, has a high gear ratio. Thus, in particular, the other gears of the vehicle transmission have lower gear ratios. Such a starting gear is in particular the first gear. Depending on the situation existing, the starting gear can vary. For example, if it is recognized that the vehicle is lightly loaded, a second gear can also be selected as the staring gear. It is also possible, depending on the situation, for a reversing gear to be selected as the starting gear.

In the neutral gear, shifting elements associated with a selected starting gear are then made ready by pre-filling or prestressing to prepare for the gearshift into the starting gear. In the pre-filled or prestressed condition no force or torque transfer by the shifting element takes place. In the partially or fully closed condition force or torque transfer by the shifting element takes place.

In the context of the method according to the invention, it is provided that with the neutral gear engaged, at least one transmission condition of the vehicle transmission is determined. When this transmission condition is determined, if it is found that when the neutral gear is engaged a transmission condition with elevated drag losses exists, then it is provided that in addition to the shifting elements already actuated in the neutral gear, a shifting element of the vehicle transmission associated with the reversing gear is also closed.

By virtue of closing the shifting element of the reversing gear, a torque direction at the output of the vehicle transmission is reversed, whereby the elevated drag losses of the vehicle transmission and thus also a torque at the transmission output are reduced. Thus, by closing the shifting element for the reversing gear an undesired rolling condition of the vehicle in the forward direction can be prevented.

The transmission condition with elevated drag losses is produced in particular when the vehicle transmission has not yet reached a high enough temperature. When the transmission is cool the lubricant present in it (usually transmission oil) has relatively high viscosity. The component friction and splashing losses in the transmission are correspondingly high. A shifting element that is correctly pre-filled or pre-stressed under normal operating conditions can in these circumstances still transmit some undesired torque. This transmission condition is therefore equivalent to a "cold" vehicle transmission. The said transmission condition can exist, for example, if the transmission lubricant is below a certain temperature, such as 40° C.

Determining whether or not the transmission is in a condition with elevated drag losses, can be performed in any desired way. This takes place, in particular, with reference to a transmission temperature, especially a temperature of the transmission lubricant (oil temperature). For that purpose, a temperature sensor is preferably provided in the vehicle transmission. Alternatively, or in addition, the determination can be done with reference to a temperature model of the vehicle transmission. Alternatively, or in addition, this can be done with reference to a time that has passed since the starting of a motor of a drive motor of the vehicle that is or can be coupled to the vehicle transmission. Further determination methods not explicitly mentioned here can also be used. Preferably, the determined transmission temperature, or the time passed, is compared with a threshold value. If the transmission temperature or the time passed is below the threshold value, it is assumed from this that the transmission is in a condition with elevated drag losses. If the transmission temperature or the time passed is above the threshold value, it is assumed from this that an operating temperature of the vehicle transmission has been reached or exceeded, and the transmission condition of elevated drag losses does not exist, or no longer so. The transmission is then running hot, whereby the drag losses in the transmission are reduced sufficiently. Then it is advantageously provided that in the vehicle transmission the neutral gear is engaged. The temperature threshold value is preferably between 30° C. and 50° C. A particularly suitable threshold value for the temperature is between 35° C. and 45° C.

Preferably, the operation of the vehicle transmission is monitored continuously or at regular intervals. During this it is in particular determined whether the neutral gear is engaged and whether a condition of elevated drag losses exists. For that purpose, in particular, sensor information from sensors of the vehicle and vehicle transmission, which information is indicative of the said condition, is evaluated. In particular, it is determined whether the neutral gear is actually engaged. This can be done in any desired way, for example with reference to actuation signals for valves of the vehicle transmission used for actuating the shifting elements. Alternatively, or in addition, it can be done with reference to pressure signals from one or more pressure sensors of the vehicle transmission for the pressure medium. Other determination methods not explicitly mentioned here can also be used.

If during the determination of the transmission condition it has been found that with the neutral gear engaged there is a transmission condition with elevated drag losses and consequently, in addition to the shifting elements already actuated in the neutral gear, the shifting element of the vehicle transmission associated with the reversing gear has also been closed, then in an advantageous embodiment of the invention it is provided that the vehicle is monitored to see whether it is changing to a rolling condition.

By closing the shifting element of the reversing gear, a torque direction at the output of the vehicle transmission is reversed, whereby the elevated drag losses of the vehicle transmission and hence also a torque at the transmission output are reduced. If the drag losses are sufficient for a torque still to be applied at the transmission output, by which rolling of the vehicle in reverse is taking place, this can be recognized by monitoring whether the vehicle is changing to a rolling condition.

The determination of whether a rolling condition exists can be carried out in any desired way. In particular this is done with reference to a drive output rotation speed of the vehicle transmission, i.e. a rotation speed at the transmission output. For that purpose, a rotation speed sensor can be provided on the transmission output. In most cases this rotation speed sensor is already provided for other purposes as well. Alternatively, or in addition, it can be done with reference to an acceleration of the vehicle. For this, for example, an acceleration sensor of the vehicle can be used. For example, if the rotation speed or the acceleration exceeds a particular threshold value, then a rolling condition of the vehicle exists. Other determination methods not explicitly mentioned here can also be used.

If the transmission is in a condition with elevated drag losses and, as the rolling condition, reverse rolling is determined, then in an advantageous embodiment of the invention it is provided that the shilling element of the reversing gear closed in addition to the shifting elements actuated in the neutral gear, is opened and a shifting element of a starting gear designed to be a forward gear is closed. In that way the rolling condition of the vehicle recognized as rolling in reverse can be terminated.

During this, if closing the shifting element of the forward-driving starting gear results in a rolling condition of the vehicle in the forward direction, then in a further embodiment of the invention it is provided that the shifting element of the starting gear designed as a forward gear is opened and the shifting element of the reversing gear is closed again. In that way the rolling condition of the vehicle recognized as rolling forward, can be terminated.

By active switching between the shifting element for the reversing gear and the shifting element for the starting gear in the forward direction, the vehicle in a transmission condition with elevated drag losses can be prevented from rolling away.

The method proposed is controlled by the also proposed transmission control unit. This means that the method is carried out by means of the transmission control unit. Accordingly, the transmission control unit proposed is specially designed such that it carries out the method with the steps indicated in each case. For that purpose, in particular the transmission control unit comprises an input, an output and computation means. For this, the transmission control unit also comprises in particular a storage medium (data storage), in which the special commands required for carrying out the method are stored. The input of the transmission control unit is designed to receive the information required by the transmission control unit, for example the transmission temperature at the time and the drive output rotation speed at the time. The output of the transmission control unit is designed to emit the control signals required for the actuation of the shifting elements, for example signals to open and close valves of the shifting elements. The computation means carry out the commands stored in the storage medium, during which process the incoming information is processed and the corresponding control signals for the shifting elements are emitted. The computation means consist, in particular, of a microprocessor.

A computer program according to the invention is designed to enable a transmission control unit to implement the method according to the invention or a preferred further development thereof, when the computer program is run in the transmission control unit. In this connection the object of the invention also includes a computer-readable medium on which the above-described computer program is stored and from which it can be called up.

BRIEF DESCRIPTION OF THE DRAWINGS

Below, the invention is explained in greater detail with reference to figures, from which preferred embodiments and features of the invention emerge. The figures show.

DETAILED DESCRIPTION

Figures 1, 2:
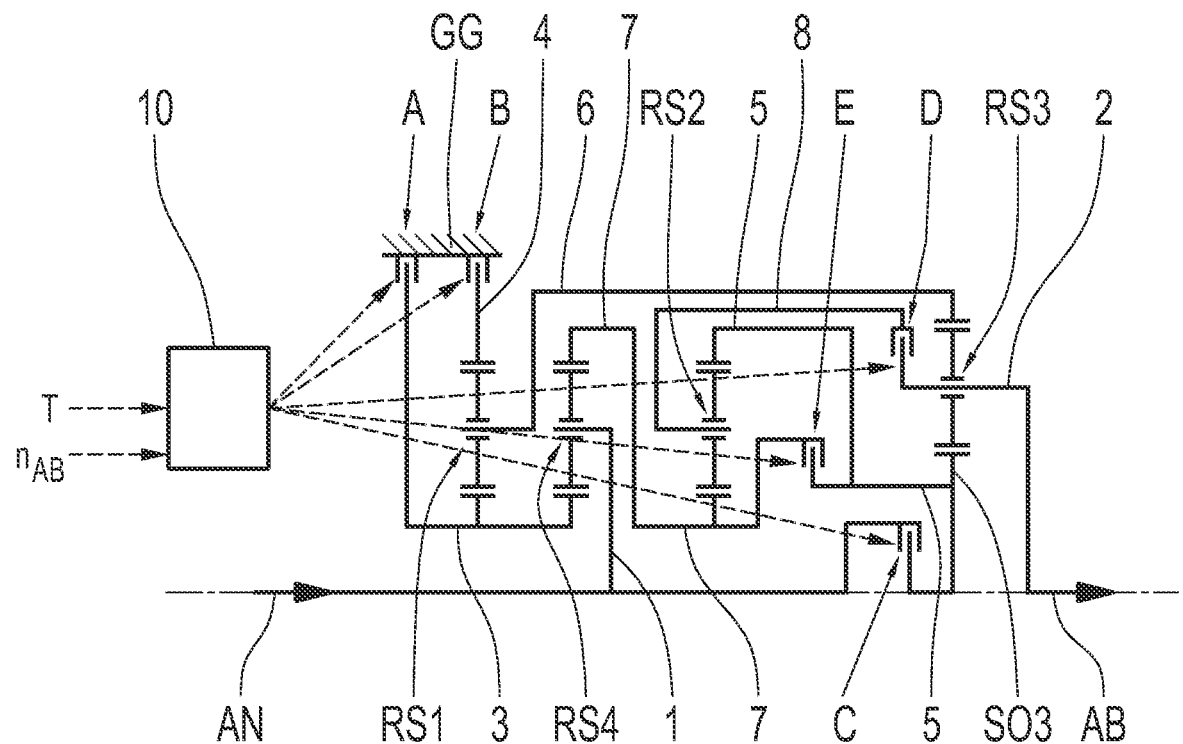
FIG. 1: A schematic representation of an automatic transmission of planetary design.
FIG. 2: An example of a shifting scheme for the automatic transmission of FIG. 1.

In a schematic representation, FIG. 1 shows the arrangement of shafts AN, AB, 1, 2, 3, 4, 5, 6, 7, 8 and planetary gearsets RS1, RS2, RS3, RS4 and shifting elements A, B, C, D, E of a preferred multi-gear vehicle transmission of planetary design. For greater clarity only the upper half of the vehicle transmission is shown. In particular, the lower half is a mirror image structure of this upper half. The drive input shaft AN is usually coupled to a drive motor of the vehicle or can be coupled to it by way of a separate clutch such as a hydrodynamic torque converter. The drive output shaft AB is usually coupled to drive wheels of the vehicle or can be coupled thereto.

In FIG. 1 a transmission control unit 10 is also shown, which serves to actuate the shifting elements A, B, C, D, E of the transmission. Thus, the control unit 10 enables the shifting elements A, B, C, D, E to be selectively opened and closed. In that way the gear appropriate for the situation at the time or called for by a driver of the vehicle can be engaged. For this, appropriate information is fed into the control unit 10 via the input of the control unit. The control unit 10 processes that information and emits appropriate signals for actuating the shifting elements A, B, C, D, E via the output of the control unit.

Among other things, the information T and the information $n_{AB}$ are fed into the control unit 10. The information T is a temperature signal which represents the transmission temperature. The temperature signal T is for example determined by a temperature sensor of the transmission. The information $n_{AB}$ is a rotation speed signal which represents the rotation speed of the drive output shaft AB.

Usually, the shifting elements A, B, C, D, E are actuated by means of a pressure medium. For that purpose, with each shifting element A, B, C, D, E there is associated an actuating piston which can be acted upon individually by the pressure of the pressure medium. For that purpose, the control unit 10 actuates the valves associated with the actuating piston concerned. As the pressure medium, in the transmission shown in FIG. 1 the lubricant of the transmission (transmission oil) is usually used.

The transmission can be shifted to a neutral gear, in which the drive input shaft AN is decoupled from the drive output shaft AB. For this an appropriate number of the shifting elements A, B, C, D, E are opened, specifically the shifting elements C, D, E. On the other hand some of the shifting elements A, B, C, D, E, specifically the shifting elements A and B associated with a starting gear, can already be actuated in the neutral gear in such manner that the shifting element A is preferably closed and the shifting element B preferably pre-filled. The driving gears of the transmission serve to propel the vehicle. In this case, eight forward gears and one reversing gear are available as driving gears. With the transmission shown in FIG. 1, in the driving gears in each case three of the five shifting elements A, B, C, D, E are always closed and the other two shifting elements A, B, C, E are open. To carry out a gearshift and thereby to carry out a shifting process, at least one of the previously open shifting elements A, B, C, D, and E of the automatic transmission is closed or engaged and at least one of the previously closed shifting elements A, B, C, D, and E is opened or disengaged.

In the starting gear the vehicle is accelerated from rest or from very low speeds. Thus, the starting gear has a relatively high gear ratio. Depending on the load condition and the desired travel direction, suitable starting gears of the transmission in particular are the first gear (shifting elements A, B, C closed and D, E open), or the second gear (shifting elements A, B, E closed and C, D open) or the reversing gear (shifting elements A, B, D closed and C, E open).

FIG. 2 shows an example shifting scheme of the automatic transmission of FIG. 1. In each gear three shifting elements A, B, C, D, E are closed and two shifting elements A, B, C, D, E are open. The shilling elements are in the form of brakes A, B and clutches C, D, E.

The first forward gear is obtained by closing the brakes A and B and the clutch C, the second forward gear by closing the brakes A and B and the clutch E, the third forward gear by closing the brake B and the clutches C and E, the fourth forward gear by closing the brake B and the clutches D and E, the fifth forward gear by, closing the brake B and the clutches C and D, the sixth forward gear by closing the clutches C, D and E, the seventh forward gear by closing the brake A and the clutches C and D and the eighth forward gear by closing the brake A and the clutches D and E. The reversing gear is obtained by closing the brakes A and B and the clutch D.

Below, a preferred procedure for operating the above-described automatic transmission with the neutral gear engaged is explained. This procedure is carried out by the transmission control unit 10, which is correspondingly designed to do that. As already described above, the engagement of the neutral gear is called for, for example, by a driver of the vehicle or automatically.

For the neutral gear at least the shifting elements C, D, E are opened. In this example the first gear serves as the starting gear. To engage the first gear, the shifting elements A, B, C must be closed and the shifting elements D and E open.

When the neutral gear is engaged it is first determined whether the transmission is in a condition with elevated drag losses. This is done specifically in that the control unit 10 compares the current temperature T of the transmission with a threshold value. For example, the threshold value might be 40° C. If the temperature T determined is lower than that, the transmission is still relatively cold and the transmission lubricant correspondingly has high viscosity. Accordingly, the drag losses in the transmission can be expected to be relatively elevated so that the transmission is in an elevated drag-loss condition. If the temperature determined is higher the transmission is sufficiently hot and the transmission lubricant correspondingly has low viscosity. Accordingly, the drag losses in the transmission can be expected to be low so that the transmission is not in an elevated drag-loss condition.

If a transmission condition with elevated drag losses has been recognized, then it is provided that in addition to the shifting elements A, B actuated in the neutral gear, the shifting element D for the reversing gear is also closed. The shifting element D is not one of the shifting elements A, B, C to be actuated for the first gear of the vehicle transmission. By closing the shifting element D of the reversing gear, a rotation speed direction at the drive output of the vehicle transmission is reversed, whereby the elevated drag losses in the vehicle transmission are reduced. By reducing the drag losses of the vehicle transmission, the torque present at the transmission output is also reduced, so that an undesired rolling condition of the vehicle is prevented.

If the operating temperature of the vehicle transmission is reached before the driver or an automatic system calls for a driving gear, then the neutral gear is engaged in the vehicle transmission. In that case the clutches C, D, E are opened and the brake B is pre-filled, while the brake A is closed. If the vehicle transmission has reached its operating temperature, then the drag losses of the vehicle transmission with the neutral gear engaged are so low that the vehicle does not change to an undesired rolling condition.

By virtue of the procedure described, an undesired rolling condition of the vehicle when the vehicle transmission is cold, i.e. when drag losses are elevated, can be reliably avoided.

The method according to the invention can also be used with other multi-gear vehicle transmissions. For example, the method according to the invention can also be used with automatic transmissions which may be designed, for example, as 5-gear, 6-gear, 7-gear, 9-gear or 10-gear transmissions. The number of gearsets, the number of shifting elements and the number of shifting elements of the vehicle transmission closed in the driving gear can also be different.

Figures 3, 4:
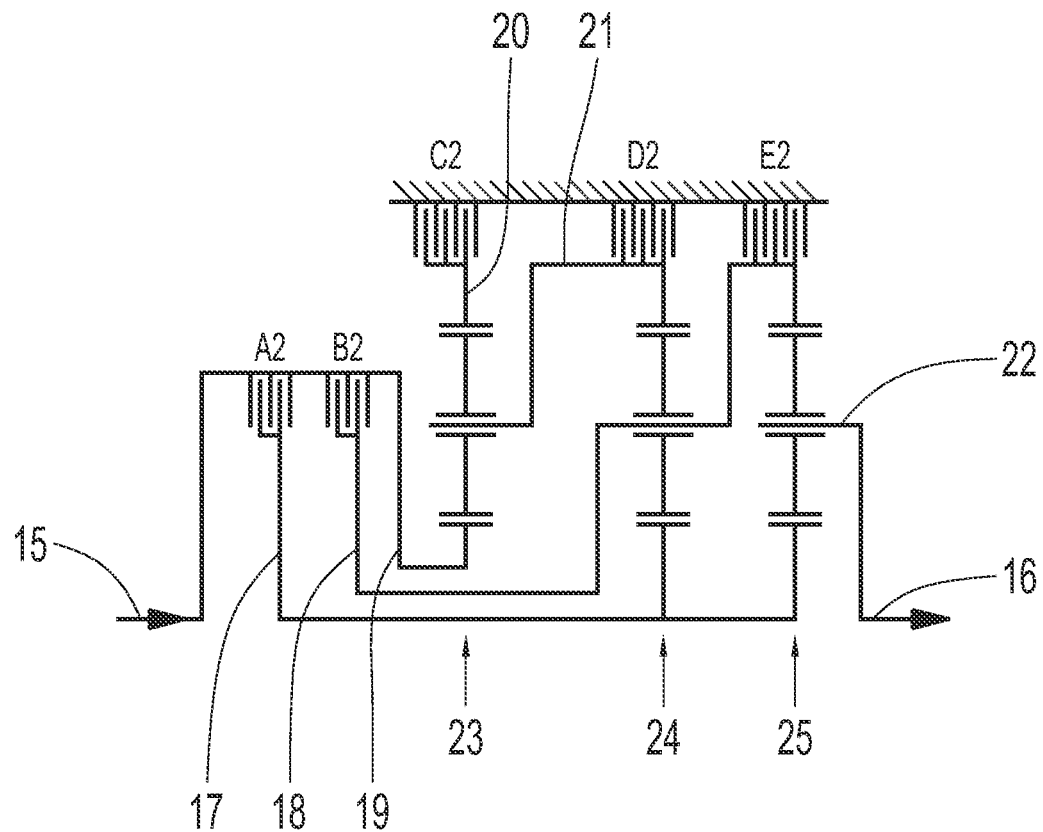
FIG. 3: A schematic representation of a further automatic transmission of planetary design.
FIG. 4: An example of a shifting scheme for the automatic transmission of FIG. 3.

Thus, FIG. 3 shows a second example transmission structure of an example automatic transmission for a motor vehicle in which the method according to the invention can be used. A drive aggregate (not shown) can be coupled to a transmission input 15 of the automatic transmission and a drive output of the motor vehicle (not shown) can be coupled to a transmission output 16 of the automatic transmission.

The automatic transmission shown in FIG. 3 is of planetary design and has a total of six shafts 17, 18, 19, 20, 21 and 22, wherein the shaft 19 is a transmission input shaft and the shaft 22 is a transmission output shaft. The shafts 17 to 22 of the automatic transmission of FIG. 3 are drive-connected on the one hand by gearsets 23, 24, and 25 and on the other hand by transmission-internal shifting elements A2, B2, C2, D2, and E2. The shifting elements A2, B2, C2, D2, and E2 are actuated by a transmission control unit (not shown here).

The automatic transmission shown in FIG. 3 has three gearsets 23, 24, and 25 and five shifting elements A2, B2, C2, D2, and E2, the shifting elements A2 and B2 being in the form of clutches while the shifting elements C2, D2, and E2 are in the form of brakes. With the automatic transmission shown in FIG. 3 a total of six forward gears and one reversing gear can be engaged, and in each of these gears two shifting elements are closed and three shifting elements are open. To carry out a gearshift and thus a shifting process, at least one of the previously open shifting elements A2, B2, C2, D2, and E2 of the automatic transmission is closed or engaged and at least one of the previously closed shifting elements A2, B2, C2, D2, and E2 is opened or disengaged. The transmission structure shown in FIG. 3 is presented purely as an example. In addition to the frictional shifting elements interlocking shifting elements can also be present.

FIG. 4 shows an example shifting scheme for the automatic transmission according to FIG. 3. In each gear two of the shifting elements A2, B2, C2, D2, and E2 are closed and three of the shifting elements A2, B2, C2, D2, and E2 are open. The shifting elements are in the form of clutches A2, B2 and brakes C2, D2, and E2.

The first forward gear is obtained by closing the clutch A2 and the brake E2, the second forward gear by closing the clutch A2 and the brake D2. the third forward gear by closing the clutch A2 and the brake C2, the fourth forward gear by closing the clutches A2 and B2, the fifth forward gear by closing the clutch B2 and the brake C2, and the sixth forward gear by closing the clutch B2 and the brake D2. The reversing gear is obtained by closing the brakes C2 and E2.

For the neutral gear at least the shifting elements A2, B2, C2, and D2 are opened. In this example, as the starting gear the first gear is again used. To engage the first gear the shifting elements A2 and E2 have to be closed while the shilling elements B2, C2, and D2 are open.

When the neutral gear is engaged, it is first of all determined whether the transmission is in the condition of elevated drag losses. Whether the transmission is in the condition of elevated drag losses can be determined as already described above.

If a condition with elevated drag losses has been recognized, then it is provided that the shifting element C2 of the reversing gear of the vehicle transmission is closed in addition to the shifting element E2 actuated in the neutral gear. The shifting element C2 is not one of the shifting elements A2, E2 to be actuated for the first gear of the vehicle transmission. By closing the shifting element C2 of the reversing gear, a torque direction at the drive output of the vehicle transmission is reversed, whereby the elevated drag losses of the vehicle transmission are reduced. By reducing the drag losses of the vehicle transmission, the torque at the drive output of the transmission is also reduced, whereby an undesired rolling condition of the vehicle is prevented.

If the operating temperature of the vehicle transmission has been reached before the driver or an automatic system calls for a driving gear, then as already described above the neutral gear can be engaged in the vehicle transmission. For this the clutches A2, B2 and the brakes C2, D2 are opened, while the brake E2 can be pre-filled or closed. If the vehicle transmission has reached its operating temperature, then the drag losses in the vehicle transmission with the neutral gear engaged are so low that the vehicle does not change to an undesired rolling condition.

By virtue of the method proposed an undesired rolling condition of the vehicle when the vehicle transmission is cold, i.e. in a transmission condition with elevated drag losses, can be reliably avoided.

INDEXES

1 Shaft
2 Shaft
3 Shaft
4 Shaft
5 Shaft
6 Shaft
7 Shaft
8 Shaft
10 Transmission control unit
15 Transmission input
16 Transmission output
17 Shaft
18 Shaft
19 Shaft
20 Shaft
21 Shaft
22 Shaft
23 Gearset
24 Gearset
25 Gearset
A Shifting element/Brake
B Shifting element/Brake
C Shifting element/Clutch
D Shifting element/Clutch
E Shifting element/Clutch
AN Drive input shaft
AB Drive output shaft
GG Housing
RS1 Planetary gearset
RS2 Planetary gearset
RS3 Planetary gearset
RS4 Planetary gearset
SO3 Sun gear
A2 Shifting element/Disk clutch
B2 Shifting element/Disk clutch
C2 Shifting element/Disk brake
D2 Shifting element/Disk brake
E2 Shifting element/Disk brake

The invention claimed is:

1. A method for operating a multi-gear vehicle transmission that includes shifting elements for engaging gears of the vehicle transmission, the method comprising:
   decoupling a transmission drive input from a transmission drive output of the vehicle transmission when in a neutral gear, wherein some of the shifting elements of a driving gear are already actuated;
   coupling the transmission drive input and the transmission drive output of the vehicle transmission while in the driving gear by closing the shifting elements associated with the driving gear, in order to propel the vehicle;
   determining whether a transmission condition with elevated drag losses exists when the neutral gear is engaged; and
   closing a shifting element of the vehicle transmission associated with a reversing gear if the transmission condition with elevated drag losses exists, in addition to the shifting elements actuated in the neutral gear.

2. The method according to claim 1, wherein determining whether the transmission condition with elevated drag losses exists includes taking into account one or more of (i) a transmission temperature, (ii) an operating duration of the vehicle transmission since starting a motor of a drive motor that is or can be coupled to the vehicle transmission, and (iii) a temperature model of the vehicle transmission.

3. The method according to claim 1, wherein, in all the driving gears of the vehicle transmission, at least or exactly three shifting elements are closed.

4. The method according to claim 3, further comprising:
   closing a further shifting element of the vehicle transmission in addition to the shifting elements actuated in the neutral gear, performed together with engaging a forward starting gear of the vehicle transmission or with engaging the reversing gear of the vehicle transmission.

5. The method according to claim 1, further comprising determining whether the vehicle is in a rolling condition when the transmission condition with elevated drag losses exists.

6. The method according to claim 5, wherein determining whether the vehicle is in the rolling condition includes taking into account one or more of (i) a drive output rotation speed of the vehicle transmission, (ii) a wheel rotation speed of the vehicle, and (iii) an acceleration of the vehicle.

7. The method according to claim 5, comprising:
   detecting a reverse rolling condition;
   opening the shifting element of the reversing gear; and
   closing a shifting element of a forward starting gear.

8. The method according to claim 7, further comprising:
   determining that the transmission condition with elevated drag losses still exists;
   detecting a forward rolling condition of the vehicle;
   opening the shifting element of the forward starting gear after closing the shifting element of the forward starting gear; and
   closing the shifting element of the reversing gear.

9. The method according to claim 1 comprising:
   engaging the neutral gear when an operating temperature of the vehicle transmission has been reached or exceeded.

10. A transmission control unit configured to carry out a method according to claim 1.

11. The transmission control unit of claim 10 comprising computer executable code that when executed by the transmission control unit carries out the method according to claim 1.

12. A vehicle transmission comprising the transmission control unit according to claim 11.

13. A motor vehicle comprising the vehicle transmission according to claim 12.

14. The method according to claim 1, wherein determining whether the transmission condition with elevated drag losses exists includes taking into account one or more of (i) a lubricant temperature of the vehicle transmission, (ii) an operating duration of the vehicle transmission since starting a motor of a drive motor that is or can be coupled to the vehicle transmission, and (iii) a temperature model of the vehicle transmission.

\* \* \* \* \*